INVENTOR
E.B.FERRELL
BY
Franklin Mohr
ATTORNEY

July 15, 1947.  E. B. FERRELL  2,423,829
INDICATING SYSTEM
Filed Sept. 16, 1943  2 Sheets—Sheet 2
FIG. 2
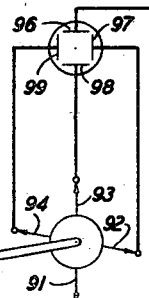
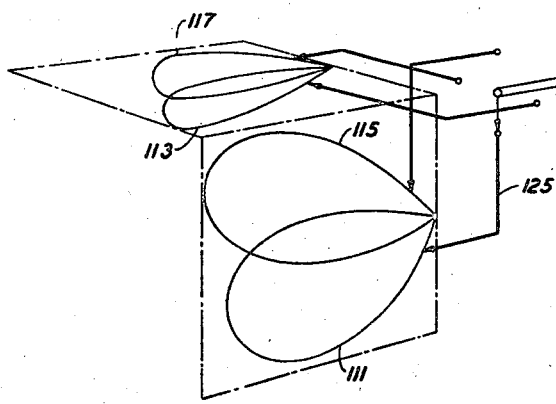
FIG. 3
FIG. 4
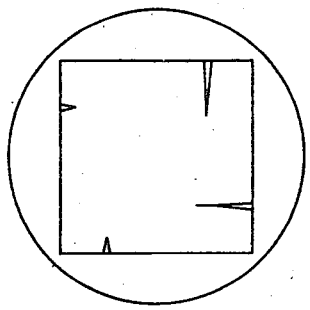
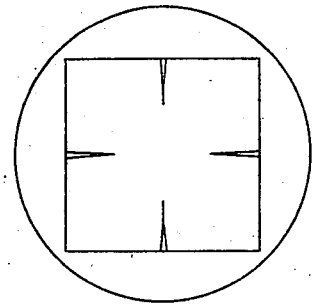
INVENTOR
E. B. FERRELL
BY
Franklin Mohr
ATTORNEY Patented July 15, 1947

2,423,829

UNITED STATES PATENT OFFICE 2,423,829

INDICATING SYSTEM

Enoch B. Ferrell, Chatham, N. J., assignor to Bell Telephone Laboratories, Incorporated, New York, N. Y., a corporation of New York Application September 16, 1943, Serial No. 502,627

4 Claims. (Cl. 315—24)

This invention relates to the determination of the range, azimuth and elevation of a fixed or moving object, and more particularly to arrangements in which electromagnetic waves are transmitted from an observing station to the object, the time of travel of the waves to the object and return being observed together with the direction of propagation of the returned wave as indicated by a direction finding device.

An object of the invention is to facilitate rapid and continuous determination by a single unaided observer of the range, azimuth and elevation of an object while the object and the observer may be moving relatively to each other at a rapid rate.

A related object is to simplify the necessary equipment and procedure to a point which will enable the observer to make substantially simultaneous observations of the three above-mentioned coordinates of the object under observation.

A feature of the invention is the use of a single display device such as an oscilloscope to indicate simultaneously any deviation of the direction finding device from accurate pointing in the direction of the returned waves and at the same time to indicate any deviation of the range indicating system from the correct range of the object.

In accordance with the invention, the range, azimuth and elevation of the object are correctly indicated on separate scales or dials whenever the oscilloscope shows that the deviations have been rendered substantially nil.

In the drawings:

Fig. 2 is a diagram useful in explaining the electrical commutations employed in the system of Fig. 1;

Fig. 3 is representative of the pattern which may appear upon the screen of the oscilloscope when the correct values of the range, azimuth and elevation have not been determined; and Fig. 4 is representative of the pattern appearing when the correct readings of these quantities are being exhibited on the respective scales or dials in the arrangement of Fig. 1.

Figure 1:
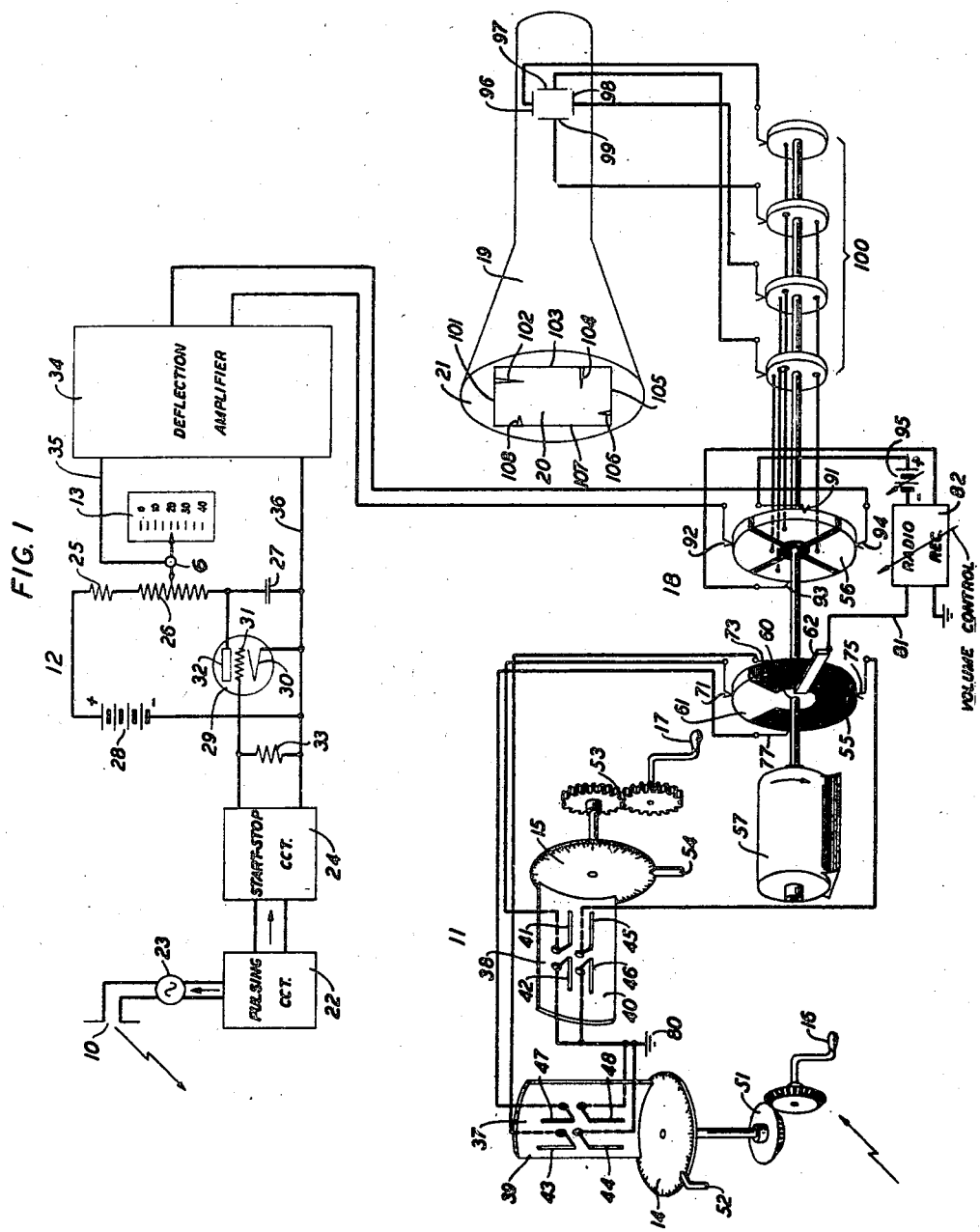
Fig. 1 is a schematic representation of a measuring and indicating system in accordance with the invention.

In the arrangement of Fig. 1 there are provided a transmitting antenna 10 for sending out electromagnetic waves, preferably of ultra-short or quasi-optical wavelengths, and a directionally selective receiving system 11 for such waves, capable of being pointed in any desired direction.

Range measuring equipment 12 is provided having a range scale 13 and the receiving equipment 11 is provided with an azimuth dial 14 and an elevation dial 15. The setting of the range measuring device 12 and the accompanying reading of the scale 13 may be adjusted by means of a knob 6. The azimuth and elevation angles of the receiving device 11 and the accompanying readings of scales associated with the dials 14 and 15 may be controlled through suitable means, such as gearing, which may be provided with handles 16 and 17 respectively. Electrical responses from the range measuring device 12 and the directional receiving equipment 11 are transmitted through motor driven commutating means indicated generally at 18 to the deflection plates of a cathode ray oscillosope 19.

During operation of the system of Fig. 1, a distinctive pattern or trace 20 appears upon the screen 21 of the oscilloscope 19 to guide the operator to the correct settings of the scale 13 and dials 14 and 15 in a manner described more fully hereinafter.

The range measuring device 12 is preferably of the general type disclosed and claimed in the copending applications of E. Bruce, Serial No. 499,211, filed August 19, 1943, and of G. Hecht, Serial No. 502,619, filed September 16, 1943, and assigned to the assignee of the present application. The Bruce and Hecht systems are of the general type in which an electro-magnetic wave is transmitted from the observing station to the object, the range of which is to be measured, and an echo wave returning from the object is employed to make a distinguishing mark in the pattern of an oscilloscope, the cathode ray of which is meanwhile caused to sweep across the screen at a substantially constant time rate. In these systems, the oscilloscope screen is provided with a fixed index mark, preferably at the center of the screen. The starting point of the cathode ray in its sweep across the screen is made adjustable under the control of means coupled to the movable member of the range indicator so that the time required for the cathode ray to reach the fixed index mark may be varied. When the correct adjustment has been made, the cathode ray reaches the fixed index mark simultaneously with the receipt of the echo wave and the correct range is then shown by the range scale. Rapidly recurring pulses, say 400 or more per second, are employed in making the range measurements so that the pattern will be persistent and the operator may adjust the movable member of the range indicator until the mark made on the oscilloscope pattern by the echo wave is coincident with the index mark. He may then read the correct range from the range scale. It will appear that in arrangements in accordance with the present invention, the fixed mark may be dispensed with.

Reference may be made to the cited applications of Bruce and Hecht for a detailed description of the range measuring device. Accordingly, only such details as will facilitate the description of the present invention are repeated herein. The range measuring device includes a pulsing circuit 22, the function of which is to control the emission of the transmitted pulse and the simultaneous start of the cathode ray sweep. To control the transmitted pulse, the pulsing circuit is connected to an oscillator 23 of suitable high frequency which is in turn connected to the transmitting antenna 10. As directivity is not essential in the transmitter, the antenna 10 may be a simple dipole. To control the cathode ray sweep mechanism, the pulsing circuit 22 is connected to a start-stop circuit 24.

The timing of the sweep is under the control of a circuit of preferably substantially fixed resistance and fixed capacity comprising a resistor 25, a potentiometer 26 and a condenser 27, the elements 25, 26 and 27 being serially connected across the terminals of a source 28 of substantially constant electromotive force. A space discharge device 29 having a cathode 30, a grid 31 and an anode 32 is connected with its cathode-anode circuit in parallel with the condenser 27 to substantially short-circuit the condenser when the cathode-anode circuit is made conductive under the control of the grid 31. The start-stop circuit, which is disclosed in detail in the above-cited Bruce application, controls a resistor 33 which is connected between the grid 31 and the cathode 30. Immediately prior to the operation of the pulsing circuit 22 to send out a pulse from the antenna 10, the resistor 33 is carrying a biasing current supplied by the start-stop circuit 24 to render the grid 31 positive and thereby hold the tube 29 in the conductive state. Accordingly, there is substantially no potential difference between the plates of the condenser 27 and the various points along the potentiometer 26 are at graduated potentials due to the flow of current from the source 28 through the tube 29. The potential at the point of contact attached to the knob 6 on the movable arm of the potentiometer 26 depends upon the position of the movable arm. This potential is impressed upon a deflection amplifier 34 by means of a lead 35. The cathode side of the condenser 27 is connected to the opposite terminal of the deflection amplifier 34 through a lead 36. At the instant of sending out the transmitted pulse, the start-stop circuit 24 reverses the biasing current through the resistor 33, rendering the tube 29 non-conductive. Immediately the current from the source 28 is diverted to charge the condenser 27 and accordingly thereafter all points along the potentiometer begin an exponential rise in potential, the early part of which rise in substantially linear, as is well known. The rising potential of the movable point of the potentiometer, and hence the lead 35 acts through the deflection amplifier 34 to sweep the cathode ray across the screen of the oscilloscope. After a sufficient time interval to accommodate the return wave from the most distant point to be measured, the start-stop circuit 24 again reverses the polarizing current in the resistor 33 and renders the tube 29 conductive. The condenser 27 discharges rapidly through the tube 29 thereby restoring the system to the condition described as holding before the transmitted pulse was emitted. Upon the restoration of the timing circuit, the pulsing circuit acts to initiate another transmitted pulse and the process may be repeated at a rapid rate.

The receiving device 11 may comprise a pair of double lobe directive receiving arrays 37 and 38, each of which may be of any suitable type as for example the structure disclosed in United States Patent 2,002,181, issued May 21, 1935, to W. Ilberg. Instead of connecting the array to a transmitter as in the patent, the array is connected to a receiver. The array 37 is arranged with its axis vertical and is directionally selective with respect to the azimuth of a received wave. The array 38 is arranged with its axis horizontal and is directionally selective as to elevation. The array 37 comprises dipole antenna pairs 43, 44 and 47, 48, mounted parallel to but somewhat displaced from the focal line of a parabolic cylindrical reflector 39. The array 38 comprises dipole pairs 41, 42 and 45, 46 similarly disposed with respect to a reflector 40. The assembled array 37 is suitably attached to the azimuth dial 14 which has a graduated scale of angles at its periphery and may be driven by gearing 51 attached to the handle 16. The scale of the dial 14 may be read with reference to a fixed pointer 52. The assembled array 38 is suitably attached to the elevation dial 15, also graduated, and driven by gearing 53 attached to the handle 17. The scale of the dial 15 may be read against a fixed pointer 54.

The commutating system 18 comprises two commutators 55 and 56 rotatable synchronously by means of a motor 57. The commutator 55 comprises a central conductive portion 60 which is integral with a conductive quadrant 61 to which contact is continually made during revolution by means of a brush 62. About the periphery of the commutator 55 are symmetrically arranged four contactors 71, 73, 75 and 77 which are connected respectively to the receiving dipole elements 41, 43, 45 and 47. The remaining receiving dipole elements 42, 44, 46 and 48 are connected to ground at 80. The brush 62 connects through a lead 81 to a radio receiver 82.

The commutator 56 comprises four conductive segments insulated from each other and connected to individual slip rings 100. Symmetrically arranged around the periphery of the commutator 56 are four contactors 91, 92, 93 and 94. The contactors 92 and 94 are connected to the respective output terminals of the deflection amplifier 34 and the contactors 91 and 93 are connected to the output terminals of the radio receiver 82. A source 95 of biasing potential is connected in series with the contactor 91.

Fig. 2 illustrates the commutating scheme in a simplified form. The curves 111 and 115 represent the response characteristics or lobes for the receiving dipoles 41, 42 and 45, 46 respectively, corresponding to the lobes 1 and 3 of Fig. 1 of the Ilberg patent. The lobes 113 and 117 are for the dipole pairs 43, 44 and 47, 48 respectively. The lobes 113 and 117 are represented on the top surface of an imaginary cube with the lobes 111 and 115 on a vertical face of the cube in order to indicate that the lobes 113 and 117 pertain to the azimuth and the lobes 111, 115 to the elevation. In the commutating position shown in Fig. 2, which corresponds in this respect with Fig. 1, the lobe 111 is represented as being connected in circuit through a conventionalized connection 125. At the same time the pulsing terminals 91 and 93 are shown connected to the upper and lower plates 96 and 98 respectively, while the sweep circuit terminals 92 and 94 are connected to the plates 97 and 99 respectively.

The function of the commutating arrangement is to connect the four receiving dipoles in rotation to the radio receiver and at the same time to vary the connections from the deflection amplifier and from the radio receiver to the deflecting plates of the oscilloscope in a proper cyclic manner to produce a distinctive pattern on the screen 21 by which the operator may be guided in properly setting the various dials. The plate 96 when positively charged with respect to the plate 98 acts to deflect the cathode ray upward in the diagram of Fig. 1. The plate 97 when positively charged with respect to the plate 99 deflects the cathode ray to the right. Similarly, the plate 98 when positively charged with respect to the plate 96 produces a downward deflection and plate 99 when positively charged with respect to plate 97 deflects the cathode ray to the left. With the commutators in the position shown in Figs. 1 and 2, the receiving dipole 41, 42 has its element 41 connected through the contactor 71, brush 82 and lead 81 to the ungrounded side of the radio receiver 82. At the same time the biasing source 95 has its positive terminal connected through the contactor 91 to the deflecting plate 96, thereby causing the cathode ray to trace a horizontal line 101 near the top of the screen 21 in the oscilloscope 19, as shown in Fig. 1. While the commutators are in the position shown, a plurality of pulses are sent out from the transmitting antenna 10 and received on the receiving dipole 41, 42. As long as the range of the object is not changing too rapidly, the receiving pulses will make a mark such as 102 which may be directed downward by proper adjustment of the radio receiver 82 so that the output of the radio receiver will oppose the potential of the source 95, it being assumed that the radio receiver develops a rectified or unidirectional output potential. If the range scale 13 were reading the proper range of the object under observation, the mark 102 would appear at the center of the trace 101 but in general the first adjustment is not correct and the mark 102 is displaced to one side or the other. The opposing potential from the radio receiver 82 acts through the contactor 93 upon the lower plate 98. The sweep potentials from the output of the deflection amplifier 34 are impressed by way of the contactors 92 and 94 upon the deflection plates 97 and 99 respectively, to produce the horizontal sweep from the left to right along the line 101. The starting point of the sweep being dependent upon the setting of the range dial, the line 101 may not be complete.

Assume now that the range remains substantially unchanged and the commutators are advanced a quarter of a revolution in the direction of revolution indicated by the arrow on the motor. The input of the radio receiver 82 is then connected to the receiving dipole element 43 through the contactor 73. At the same time the biasing source 95 is transferred to the plate 97, the other terminal of the receiver output being connected to the plate 99. The deflection amplifier is then connected between plates 96 and 98 to produce a downward sweep along the line 103. The mark of the echo pulse will now appear at 104, in the same position with respect to the center of the sweep 103 as the mark 102 occupies with respect to the center of the sweep 101, but the length of the mark 104 will depend upon the intensity of the wave received by the dipole pair 43, 44. In the case illustrated the mark 104 is longer than the mark 102, indicating a stronger pulse from the dipole 43, 44 than was received from the dipole 41, 42. In general, the mark 104 will differ in length from the mark 102.

Assuming the commutators to be advanced another quadrant, the dipole element 45 is then connected to the radio receiver 82 and the biasing source 95 is connected to the plate 98. The other commutations are made accordingly with the result that the trace is a horizontal line 105 near the bottom of the screen and the mark of the echo pulse appears at 106. Provided that the direction to the object has not changed appreciably between the making of the mark 102 and the making of the mark 106, it is evident that with the sort of receiver response to be expected from the structure described in the above cited patent to Ilberg, the length of the pulse 106 will be complementary to that of the pulse 102. As shown in Fig. 1, the mark 102 is longer than the mark 106 indicating that the dipole element 41 is receiving a greater intensity than the element 45 which is interpreted to mean that the antenna array 38 is incorrectly set and that the array should be rotated in the proper direction to equalize the intensity received at the elements 41 and 45. In the example shown, a clockwise rotation of the dial 15 is called for, taking into account that the dipole 41, 42 has its maximum sensitivity in a downward direction.

Assuming the advance of the commutator by another quadrant, the connections will be set up so as to trace the line 107 in the upward direction, closing the figure, the mark 108 appearing above the center and being shown as smaller than the mark 104. Comparison of the marks 104 and 108 indicates that the dipole element 43 is receiving a greater intensity than the element 47 and consequently the dial 14 should be rotated counterclockwise to approach the correct azimuth reading.

The speed of the motor 57 is not critical but is preferably high enough to avoid noticeable flicker in the oscilloscope pattern. A motor speed of 1800 revolutions per minute is readily available and provides for displaying the pattern thirty times per second.

When the dials 14 and 15 have both been rotated to the correct positions, the marks 102, 104, 106 and 108 will be of equal length. If the range scale still reads incorrectly, however, the marks will all be displaced from the center points. The displacement is in the clockwise direction in the examples illustrated in Fig. 1. A clockwise rotation of the marks is an indication that the range scale reads too large a range. Accordingly, the range scale reading should be reduced until the marks move around to their central positions. This condition is accentuated by the fact that the marks will all point towards the center of the square. As the opposite marks will appear in alignment only when centered, alignment may be used to indicate the correct range reading. No index mark is then needed on the screen of the oscilloscope.

To further facilitate attaining a symmetrical pattern in the oscilloscope, the potential of the biasing source 95 may be varied to make the marks 102, 104, 106 and 108 just meet at the tips.

If desired, the bias may be made to equal average strength of the received pulse at a given range, Then with a distant target the pattern would be small and as the target came closer the pattern would grow to fill the screen. At this point the output volume of the radio receiver 82 could be controlled to keep the pattern a constant size for still closer ranges. The area of interest would always be in the very center of the screen. Accordingly, in some cases, a small cathode ray tube could be used with a magnifying glass for observing the pattern.

If it is desirable in any instance to employ directional selectivity in the transmitting antenna as well as in the receiving antenna an array like 11 may be used in place of the dipole 10 and the lobes may be successively connected to the oscillator 23 by a commutator, like 55, which may be driven synchronously by the motor 57 so that when a given lobe is in use at the transmitter, the corresponding lobe is in use at the receiver. Alternately, the array 11 may be used for transmitting and receiving by employing known methods of duplex operation.

Fig. 3 shows a front view of the pattern 20 the same as appears in perspective in Fig. 1.

Fig. 4 shows the appearance of the typical pattern when the range, azimuth and elevation dials have all been correctly set.

It will be evident that the procedure in reading range, azimuth and elevation simultaneously is to adjust the dials 13, 14 and 15 until the symmetrical pattern of the type shown in Fig. 4 appears on the screen. The dial readings then show the correct values of range, azimuth and elevation respectively, as of the instant when the symmetrical pattern was observed.

What is claimed is:

1. A visual indicator for simultaneously selecting preferred values of three variable quantities, comprising means for displaying four linear marks in two parallel pairs, means to vary the relative lengths of the marks in one pair in response to changes in the value of one of said variable quantities, means to vary the relative lengths of the marks in the other pair in response to changes in the value of a second of said variable quantities, and means to move the marks of either pair in the direction perpendicular to their lengths in response to changes in the value of the third of said variable quantities.

2. An indicating system comprising a time sweep circuit having a pair of output terminals, a source of constant potential difference having a pair of output terminals, an oscilloscope having four deflecting plates opposed in pairs, means to connect the said sweep circuit output terminals solely to one of said pairs of opposite deflecting plates, means to connect the said constant potential difference output terminals solely to the second of said pairs of opposite deflecting plates, and commutating means for periodically transferring all of said four connections each to the next adjacent deflecting plate without changing the order of the connections, whereby a square-shaped pattern is formed on the screen of said oscilloscope.

3. An indicating system in accordance with claim 2, together with means for superposing a signal potential difference upon said constant potential difference.

4. An indicating system in accordance with claim 2, together with means synchronized with said commutating means for superposing a signal potential difference upon said constant potential difference.

ENOCH B. FERRELL.

REFERENCES CITED

The following references are of record in the file of this patent:

UNITED STATES PATENTS

| Number | Name | Date |
| --- | --- | --- |
| 2,189,549 | Hershberger | Feb. 6, 1940 |
| 1,978,684 | McCreary | Oct. 30, 1934 |
| 2,098,695 | Southwick | Nov. 9, 1937 |
| 2,279,151 | Wallace | Apr. 7, 1942 |
| 2,172,395 | McSpadden | Sept. 12, 1939 |
| 2,283,951 | Ripley | May 26, 1942 |
| 2,229,698 | Hollmann | Jan. 28, 1941 |

Disclaimer 2,423,829.—*Enoch B. Ferrell*, Chatham, N. J. INDICATING SYSTEM. Patent dated July 15, 1947. Disclaimer filed Sept. 20, 1949, by the assignee, *Bell Telephone Laboratories, Incorporated*.

Hereby enters this disclaimer to claim 1 of said patent.

[*Official Gazette October 25, 1949.*]